US009597821B2

(12) United States Patent
Hardwicke et al.

(10) Patent No.: US 9,597,821 B2
(45) Date of Patent: Mar. 21, 2017

(54) FRAME ASSEMBLY, MOLD, AND METHOD FOR FORMING ROTOR BLADE (71) Applicant: General Electric Company, Schenectady, NY (US)

(72) Inventors: Canan Uslu Hardwicke, Simpsonville, SC (US); Wendy Wen-Ling Lin, Niskayuna, NY (US); Arvind Rangarajan, Santa Clara, CA (US)

(73) Assignee: General Electric Company, Schenectady, NY (US)

( * ) Notice: Subject to any disclaimer, the term of this patent is extended or adjusted under 35 U.S.C. 154(b) by 1068 days.

(21) Appl. No.: 13/628,395

(22) Filed: Sep. 27, 2012

(65) Prior Publication Data

US 2014/0084514 A1 Mar. 27, 2014

(51) Int. Cl.
B29C 33/00 (2006.01)
B29C 33/30 (2006.01)
B29L 31/08 (2006.01)

(52) U.S. Cl.
CPC .......... *B29C 33/306* (2013.01); *B29C 33/307* (2013.01); *B29L 2031/082* (2013.01)

(58) Field of Classification Search
CPC ......... B29C 43/00; B29C 43/02; B29C 43/36; B29C 33/306–33/308
USPC ........................................ 425/450.1; 294/160
See application file for complete search history.

(56) References Cited

U.S. PATENT DOCUMENTS

| 4,398,693 A | * | 8/1983 | Hahn et al. ................... 249/155 |
| 5,002,476 A | | 3/1991 | Kerr |
| 5,746,967 A | | 5/1998 | Hoy et al. |
| 5,904,972 A | | 5/1999 | Tunis, III et al. |
| 6,231,796 B1 | | 5/2001 | Allen |
| 6,558,608 B2 | | 5/2003 | Haraldsson et al. |
| 7,179,059 B2 | | 2/2007 | Sorensen et al. |
| 7,402,265 B2 | | 7/2008 | Jacobson |
| 7,530,168 B2 | | 5/2009 | Sorensen et al. |
| 2003/0056887 A1 | * | 3/2003 | Sicola ...................... B27D 1/08 156/212 |
| 2005/0035477 A1 | | 2/2005 | Jacobson |
| 2006/0231981 A1 | | 10/2006 | Lee et al. |

(Continued)

FOREIGN PATENT DOCUMENTS

| DE | 102010014961 A1 | 10/2011 |
| EP | 2283996 | 2/2011 |

(Continued)

OTHER PUBLICATIONS

European Search Report and Written Opinion issued in connection with corresponding EP Application No. 13185342.6-1706 dated Jun. 1, 2015.

*Primary Examiner* — Christina Johnson
*Assistant Examiner* — Xue Liu
(74) *Attorney, Agent, or Firm* — Dority & Manning, P.A.

(57) ABSTRACT

Frame assemblies, molds, and methods for forming rotor blades are provided. A frame assembly for a rotor blade mold includes a plurality of frames, at least one of the plurality of frames movable relative to the others of the plurality of frames, and a bed supported by the plurality of frames. Movement of the at least one of the plurality of frames causes a modification of the bed along a width-wise axis. A mold for forming a rotor blade includes a frame assembly and a mold material disposed in the bed of the frame assembly.

18 Claims, 4 Drawing Sheets

(56) References Cited

U.S. PATENT DOCUMENTS

| | | |
|---|---|---|
| 2009/0084932 A1* | 4/2009 | Livingston ................ 249/114.1 |
| 2009/0148655 A1 | 6/2009 | Nies |
| 2009/0272486 A1 | 11/2009 | Stiesdal |
| 2010/0024215 A1 | 2/2010 | Torres Martinez |
| 2010/0065192 A1 | 3/2010 | Wilson et al. |
| 2010/0065717 A1 | 3/2010 | Wilson et al. |
| 2010/0068498 A1 | 3/2010 | Wambeke et al. |
| 2010/0093922 A1 | 4/2010 | Johnson, Sr. |
| 2010/0135817 A1 | 6/2010 | Wirt et al. |
| 2011/0008147 A1 | 1/2011 | Lemos |
| 2011/0027095 A1 | 2/2011 | Jensen |
| 2011/0100542 A1 | 5/2011 | Faulkner et al. |
| 2011/0285056 A1 | 11/2011 | Davideit et al. |

FOREIGN PATENT DOCUMENTS

| | | |
|---|---|---|
| WO | WO 2009/080038 | 7/2009 |
| WO | WO 2009/083531 | 7/2009 |
| WO | WO 2009/105834 | 9/2009 |
| WO | WO 2009/139619 | 11/2009 |
| WO | WO 2009/141235 | 11/2009 |
| WO | WO 2010/018229 | 2/2010 |
| WO | WO 2010/037762 | 4/2010 |
| WO | WO 20101040575 | 5/2010 |
| WO | WO 2010/076605 | 7/2010 |
| WO | WO 2010/097657 | 9/2010 |
| WO | WO 2010/100251 | 9/2010 |
| WO | WO 2011/009462 | 1/2011 |

* cited by examiner

FRAME ASSEMBLY, MOLD, AND METHOD FOR FORMING ROTOR BLADE

FIELD OF THE INVENTION

The present disclosure relates in general to rotor blades, and more particularly to methods and apparatus for forming rotor blades.

BACKGROUND OF THE INVENTION

Wind power is considered one of the cleanest, most environmentally friendly energy sources presently available, and wind turbines have gained increased attention in this regard. A modern wind turbine typically includes a tower, generator, gearbox, nacelle, and one or more rotor blades. The rotor blades capture kinetic energy of wind using known airfoil principles. The rotor blades transmit the kinetic energy in the form of rotational energy so as to turn a shaft coupling the rotor blades to a gearbox, or if a gearbox is not used, directly to the generator. The generator then converts the mechanical energy to electrical energy that may be deployed to a utility grid.

Rotor blades for wind turbines are typically formed by laying up various layers of composite materials in a mold. The use of such a mold typically produces one portion of the rotor blade, which may include for example the pressure side or the suction side. A second mold may be utilized to produce a mating second portion, which may include the other of the pressure side or the suction side. These portions may then be affixed together to produce a rotor blade.

After the shape of a rotor blade has been designed, a mold must be developed based on this shape to produce a rotor blade having the desired shape. Currently, however, the construction of a mold for a new rotor blade is an extremely time-consuming process, in many cases taking up to or over a year. Further, even slight changes in portions of the rotor blade shape require the construction of a new tool that incorporates these changes. The construction of such molds is additionally an expensive process, requiring for example integrated heating systems, support frames, etc. Because each mold can only be utilized for a single rotor blade geometry, the overall process for modifying or redesigning the shape of a rotor blade and then forming the rotor blade is time-consuming and expensive, due in part to the mold construction requirements for each individual rotor blade shape.

Accordingly, improved methods and apparatus for forming rotor blades are desired in the art. In particular, reconfigurable molds and frame assemblies thereof, which allow for the use of the mold to form multiple rotor blades with different shapes, would be advantageous.

BRIEF DESCRIPTION OF THE INVENTION

Aspects and advantages of the invention will be set forth in part in the following description, or may be obvious from the description, or may be learned through practice of the invention.

In one embodiment, a frame assembly for a rotor blade mold is disclosed. The frame assembly includes a plurality of frames, at least one of the plurality of frames movable relative to the others of the plurality of frames, and a bed supported by the plurality of frames. Movement of the at least one of the plurality of frames causes a modification of the bed along a width-wise axis.

In another embodiment, a mold for forming a rotor blade is disclosed. The mold includes a frame assembly. The frame assembly includes a plurality of frames and a bed supported by the plurality of frames. At least one of the plurality of frames is movable relative to the others of the plurality of frames. Movement of the at least one of the plurality of frames causes a modification of the bed along a width-wise axis. The mold further includes a mold material disposed in the bed.

In still another embodiment, a method for forming a rotor blade is disclosed. The method includes providing a frame assembly, the frame assembly comprising a plurality of frames each disposed in a first position relative to one another. The method further includes inserting a plug into a mold material disposed in a bed of the frame assembly. The method further includes moving at least one frame of the frame assembly to a second position relative to another frame of the frame assembly such that the bed of the frame assembly is modified along a width-wise axis.

These and other features, aspects and advantages of the present invention will become better understood with reference to the following description and appended claims. The accompanying drawings, which are incorporated in and constitute a part of this specification, illustrate embodiments of the invention and, together with the description, serve to explain the principles of the invention.

BRIEF DESCRIPTION OF THE DRAWINGS

A full and enabling disclosure of the present invention, including the best mode thereof, directed to one of ordinary skill in the art, is set forth in the specification, which makes reference to the appended figures, in which.

DETAILED DESCRIPTION OF THE INVENTION

Reference now will be made in detail to embodiments of the invention, one or more examples of which are illustrated in the drawings. Each example is provided by way of explanation of the invention, not limitation of the invention. In fact, it will be apparent to those skilled in the art that various modifications and variations can be made in the present invention without departing from the scope or spirit of the invention. For instance, features illustrated or described as part of one embodiment can be used with another embodiment to yield a still further embodiment. Thus, it is intended that the present invention covers such modifications and variations as come within the scope of the appended claims and their equivalents.

Figure 1:
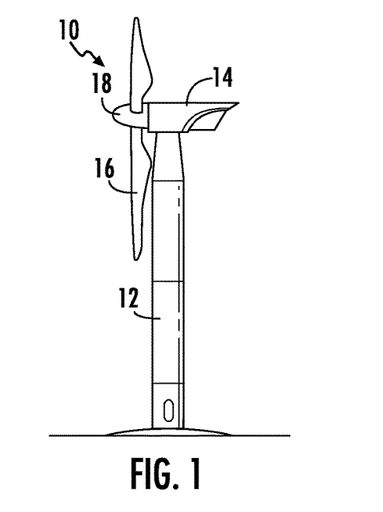
FIG. 1 is a side view of a wind turbine according to one embodiment of the present disclosure.

FIG. 1 illustrates a wind turbine 10 of conventional construction. The wind turbine 10 includes a tower 12 with a nacelle 14 mounted thereon. A plurality of rotor blades 16 are mounted to a rotor hub 18, which is in turn connected to a main flange that turns a main rotor shaft. The wind turbine power generation and control components are housed within the nacelle 14. The view of FIG. 1 is provided for illustrative purposes only to place the present invention in an exemplary field of use. It should be appreciated that the invention is not limited to any particular type of wind turbine configuration.

Figure 2:
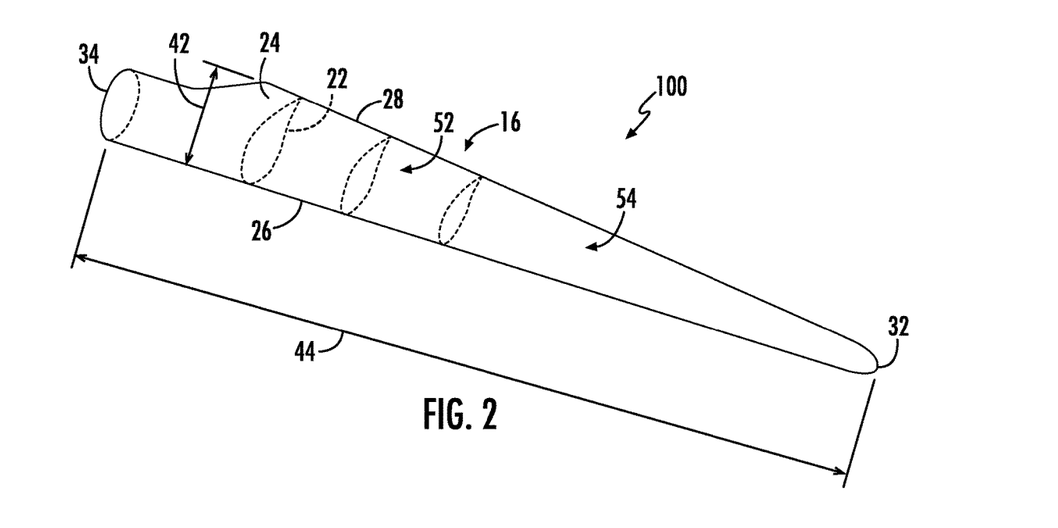
FIG. 2 is a top view of a rotor blade assembly according to one embodiment of the present disclosure.
Figure 3:
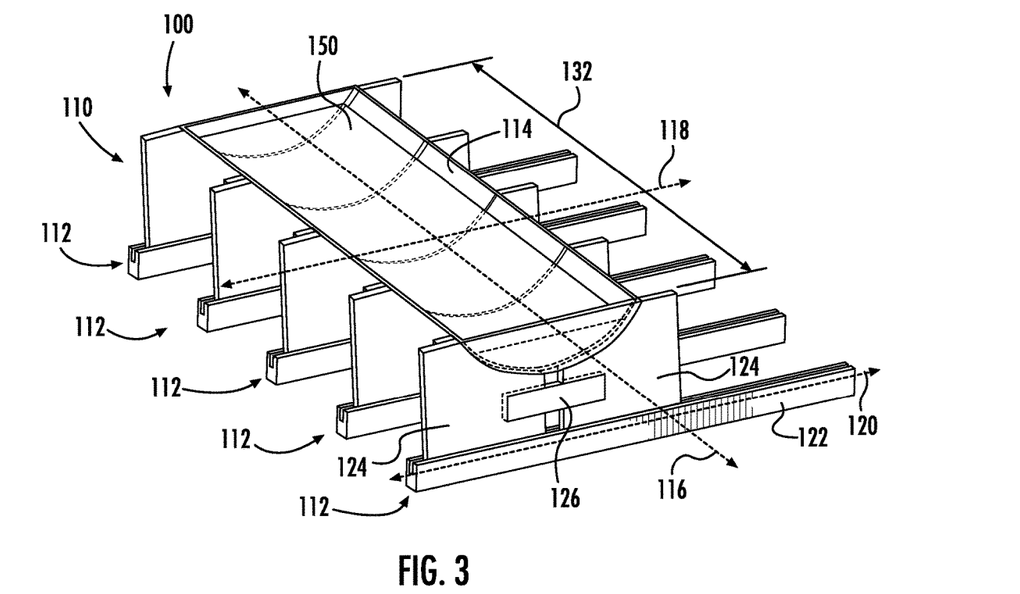
FIG. 3 is a perspective view of a mold according to one embodiment of the present disclosure.

Referring now to FIGS. 2 and 3, a rotor blade 16 according to the present disclosure may include exterior surfaces defining a pressure side 22 and a suction side 24 extending between a leading edge 26 and a trailing edge 28, and may extend from a blade tip 32 to a blade root 34. The exterior surfaces may be generally aerodynamic surfaces having generally aerodynamic contours, as is generally known in the art.

In some embodiments, the rotor blade 16 may include a plurality of individual blade segments aligned in an end-to-end order from the blade tip 32 to the blade root 34. Each of the individual blade segments may be uniquely configured so that the plurality of blade segments define a complete rotor blade 16 having a designed aerodynamic profile, length, and other desired characteristics. For example, each of the blade segments may have an aerodynamic profile that corresponds to the aerodynamic profile of adjacent blade segments. Thus, the aerodynamic profiles of the blade segments may form a continuous aerodynamic profile of the rotor blade 16. Alternatively, the rotor blade 16 may be formed as a singular, unitary blade having the designed aerodynamic profile, length, and other desired characteristics.

The rotor blade 16 may, in exemplary embodiments, be curved. Curving of the rotor blade 16 may entail bending the rotor blade 16 in a generally flapwise direction and/or in a generally edgewise direction. The flapwise direction may generally be construed as the direction (or the opposite direction) in which the aerodynamic lift acts on the rotor blade 16. The edgewise direction is generally perpendicular to the flapwise direction. Flapwise curvature of the rotor blade 16 is also known as pre-bend, while edgewise curvature is also known as sweep. Thus, a curved rotor blade 16 may be pre-bent and/or swept. Curving may enable the rotor blade 16 to better withstand flapwise and edgewise loads during operation of the wind turbine 10, and may further provide clearance for the rotor blade 16 from the tower 12 during operation of the wind turbine 10.

The rotor blade 16 may further define chord 42 and a span 44. As shown in FIGS. 2 and 3, the chord 42 may vary throughout the span 44 of the rotor blade 16. Thus, a local chord may be defined for the rotor blade 16 at any point on the rotor blade 16 along the span 44.

Additionally, the rotor blade 16 may define an inboard area 52 and an outboard area 54. The inboard area 52 may be a span-wise portion of the rotor blade 16 extending from the root 34. For example, the inboard area 52 may, in some embodiments, include approximately 33%, 40%, 50%, 60%, 67%, or any percentage or range of percentages therebetween, or any other suitable percentage or range of percentages, of the span 44 from the root 34. The outboard area 54 may be a span-wise portion of the rotor blade 16 extending from the tip 32, and may in some embodiments include the remaining portion of the rotor blade 16 between the inboard area 52 and the tip 32. Additionally or alternatively, the outboard area 54 may, in some embodiments, include approximately 33%, 40%, 50%, 60%, 67%, or any percentage or range of percentages therebetween, or any other suitable percentage or range of percentages, of the span 44 from the tip 32.

As shown in FIGS. 3 through 6, the present disclosure is further directed to molds 100 for forming rotor blades 16. A mold 100 according to the present disclosure may be utilized to form any portion of a rotor blade 16. For example, in some embodiment, a mold 100 may be utilized to include a portion of a rotor blade 16 that includes one of the pressure side 22 or suction side 24, and which may further extend to the leading edge 26 and trailing edge 28. A mating portion of the rotor blade 16 that includes the other of the pressure side 22 or suction side 24, and which may further extend to the leading edge 26 and trailing edge 28, may similarly be formed by a mold 100. Further, the rotor blade 16 portions formed by a mold 100 may include the entire span 44 between the tip 32 and root 34, or any portion thereof. For example, inboard 52 and outboard 54 portions may be formed separately or integrally.

Advantageously, molds 100 constructed according to the present disclosure, such as various components thereof, are reconfigurable for use in forming multiple rotor blades 16 having multiple shapes, including differing aerodynamic contours, spans 44, maximum chords 42, sweeps, pre-bends, etc. Thus, various components of a mold 100 formed according to the present disclosure may be formed to have a first configuration for forming a rotor blade 16 having a first shape. After use to form rotor blades 16 having this shape, the mold 100, such as various of the components thereof, may be reconfigured to a second configuration for forming a rotor blade 16 having a second shape. Thus, the construction of separate molds for different rotor blade 16 shapes is eliminated, substantially reducing the time and expense associated with the design and formation of rotor blades 16.

A mold 100 may include, for example, a frame assembly 110 as shown in FIGS. 3 through 6. The frame assembly 110 may include a plurality of frames 112 and a bed 114. The bed 114 may be supported by the frames 112. A frame 112 according to the present disclosure may be spaced apart from others of the plurality of frames 112, such as along a length-wise axis 116 of the frame assembly 110. As shown, for example, five frames 112 may be spaced apart from each other along the length-wise axis 116, and each frame 112 may support the bed 114. It should be understood that any suitable number of frames 112, such as two, three, four, six, seven, eight, or more, is within the scope and spirit of the present disclosure.

Figure 4:
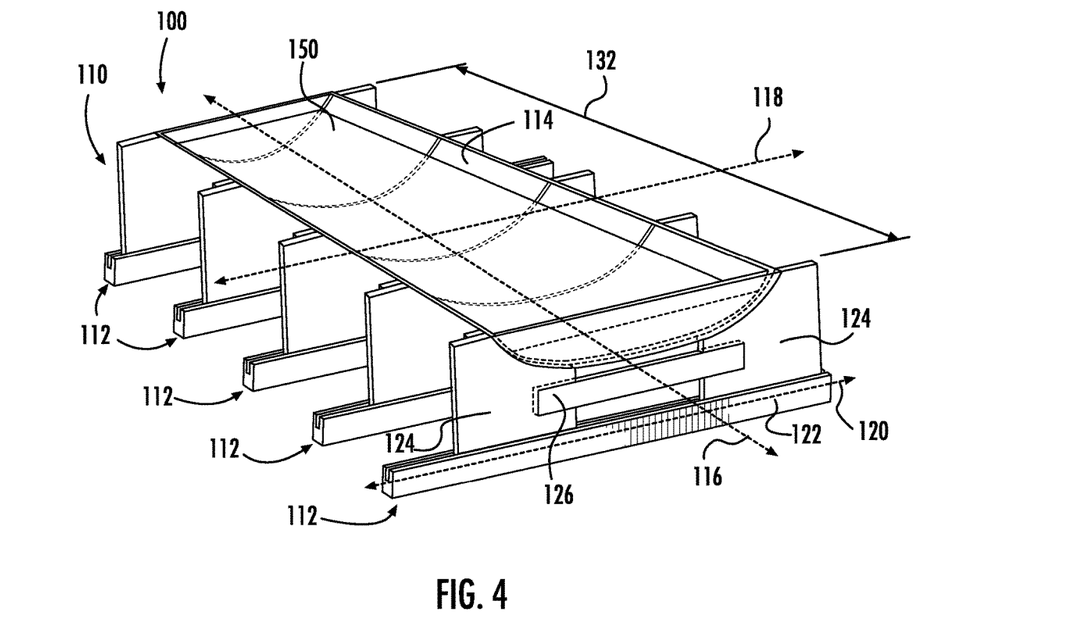
FIG. 4 is a perspective view of a mold according to another embodiment of the present disclosure.

Further, one or more frames 112 are movable relative to others of the plurality of frames 112. FIG. 4, for example, illustrates movement of various frames 112 relative to other frames 112, relative to FIG. 3. Such movement of these frames 112 may cause a modification of the bed 114 along a width-wise axis 118. For example, the bed 114 or a portion thereof may be displaced along the width-wise axis 118 due to movement of one or more frames 112, and/or the bed 114 or a portion thereof may be expanded or retracted (and thus be collectively generally referred to as "expandable") along the width-wise axis 118.

In exemplary embodiments, one or more of the frames 112 are movable along the longitudinal axis 120 of the frame 112. Further, the longitudinal axis 120 may be generally parallel to the width-wise axis 118, as shown. Alternatively, however, a frame 112 may be movable at an angle to its longitudinal axis 120 and/or the longitudinal axis 120 may be at an angle to the width-wise axis 118. Further, a frame 112, such as the components thereof as discussed below, may be displaceable and/or expandable. Such movement may displace and/or expand the portions of the bed 114 supported by these frames 112.

In some embodiments, a frame 112 according to the present disclosure includes a base 122 and one or more frame members 124. The frame members 124 may contact and support the bed 114. The base 122 may be generally stationary, such that during normal operation the base generally does not move. One or more of the associated frame members 124 may be movable with respect to the base 122. This movement of the frame members 124 may be the movement of the frame 112 that causes a modification of the bed 114. For example, as shown, a frame member 124 may be slidable along the base 122. In the embodiments as shown, a portion of a frame member 124 is disposed within the base 122 and thus slides within the base. In other embodiments, a portion of a frame member 124 may surround the base and thus slide on the outside of the base 122. Such movement of one or more frame members 124 may cause a modification of the bed 114 along the width-wise axis 118. For example, in some embodiments, the frame members 124 may move relative to the base 122. Portions of the bed 114 supported by the frame members 124 may move with the frame members 124 when the frame members 124 move relative to the base 122. These portions of the bed 114 may thus be displaced along the width-wise axis 118 based on the displacement of the frame members 124. Additionally or alternatively, associated frame members 124 of a frame 112 may move relative to one another. One frame member 124 may move away from another, or may move towards another. A spacer 126 may maintain the distance between the associated frame members 124. Portions of the bed 114 supported by the frame members 124 may move with the frame members 124 when the frame members 124 move relative to one another. These portions of the bed 114 may thus be expanded and/or retracted along the width-wise axis 118 based on the increase and/or decrease of distance between associated frame members 124.

For example, FIG. 4 illustrates one embodiment of a frame assembly 110 with some of the various frames 112 thereof moved relative to the position of the frame assembly 110 shown in FIG. 3. The forward frame 112 as shown is displaced and expanded relative to the position of that frame in FIG. 3. Intermediate frames 112 are displaced. A rear frame 112 remains stationary. The portion of the bed 114 supported by the forward frame 112 is thus displaced and expanded. Portions of the bed 114 supported by the intermediate frames 112 are displaced. Portions of the bed 114 supported by the rear frame 112 remain generally stationary. The bed 114, such as various portions thereof, is thus modified along the width-wise axis through both displacement and expansion of various portions, and is moved to a position such that the bed 114 (such as a longitudinal axis thereof) is at an angle to the length-wise axis of the frame assembly 110.

Such movement of the frames 112 relative to one another, causing modification of the bed 114 or portions thereof along the width-wise axis, thus allows for the frame assembly 110 and mold 100 to accommodate a wide variety of rotor blade 16 shapes and sizes. For example, a frame assembly 110 in a first position, such as that shown in FIG. 3, could be utilized in molding a rotor blade 16 or portion thereof that is generally straight, with minimal sweep and/or pre-bend. The frame assembly 112 could then be moved to a second position, such as that shown in FIG. 4, and be utilized in molding a rotor blade 16 or portion thereof that has an increased sweep and/or pre-bend. It should be understood that any number of frames 112 of a frame assembly 110, and the components thereof, may be movable as desired or required (displaceable and/or expandable, for example) to accommodate any suitable shape and size of rotor blade 16.

Figure 5:
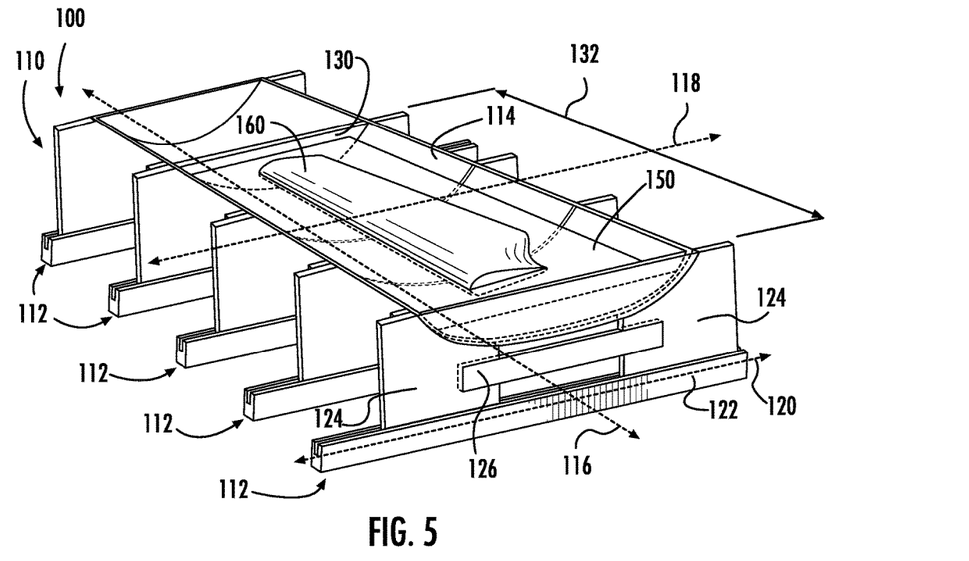
FIG. 5 is a perspective view of a mold, including a bulkhead and a plug, according to one embodiment of the present disclosure.
Figure 6:
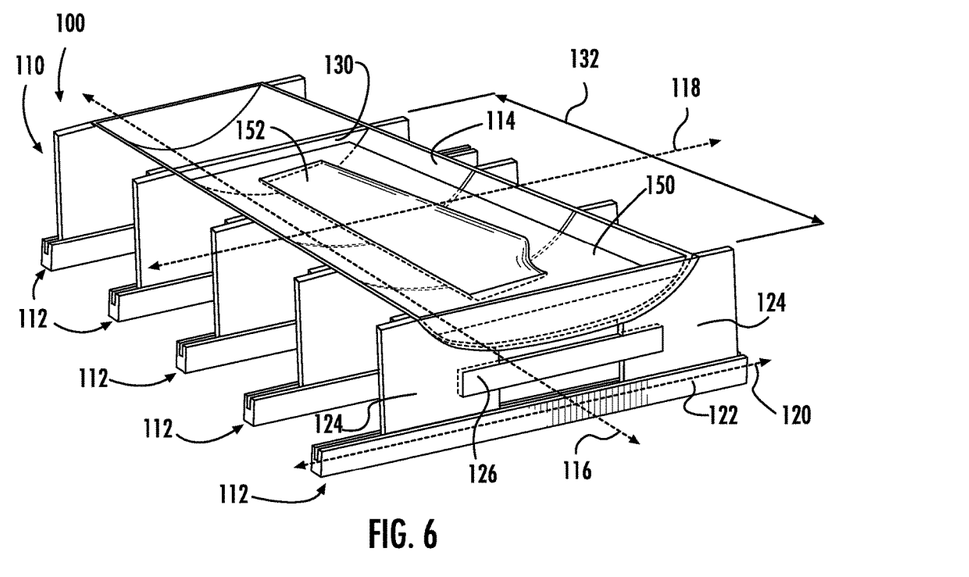
FIG. 6 is a perspective view of the mold of FIG. 5 after removal of the plug according to one embodiment of the present disclosure.

In some embodiments, as shown in FIGS. 5 and 6, a frame assembly 110 may additionally include one or more bulkheads 130. A bulkhead 130 may be positionable in the bed 114 to modify a usable length 132 of the bed 114. For example, as shown, a bulkhead 130 may be positioned in a bed 114 to shorten the usable length 132 of the bed 114 from the entire length of the bed, as measured from end to end. Thus, only a portion of the bed 114, as defined by the usable length 132, may be accessible for use in forming a rotor blade 16. The use of a bulkhead may advantageously minimize the materials required for the mold 100, such as the material that are to be included in the bed 114, when the rotor blade 16 to be formed does not require usage of the entire length of the bed 114. It should be understood that a bulkhead 130 according to the present disclosure may be removable and repositionable as desired or required.

Figure 7:
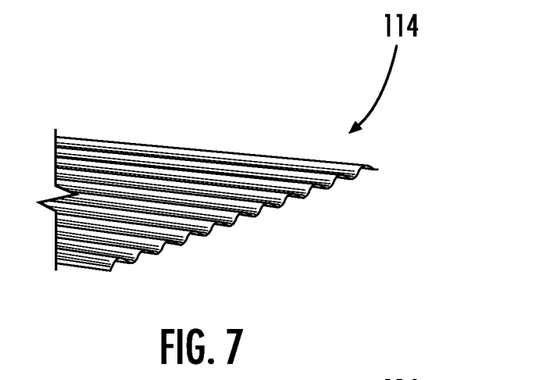
FIG. 7 is a top view of a portion of a bed of a frame assembly for a mold according to one embodiment of the present disclosure.
Figure 8:
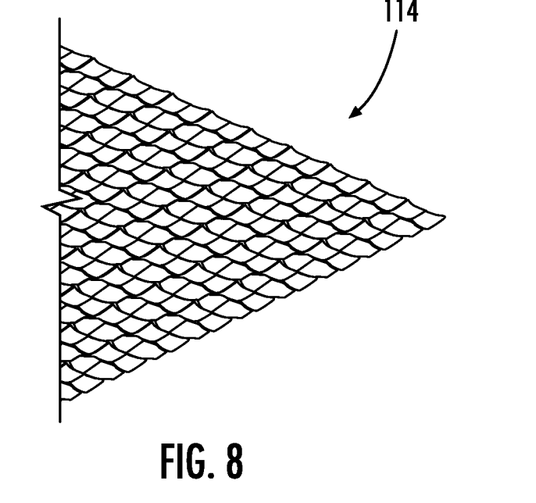
FIG. 8 is a top view of a portion of a bed of a frame assembly for a mold according to another embodiment of the present disclosure.
Figure 9:
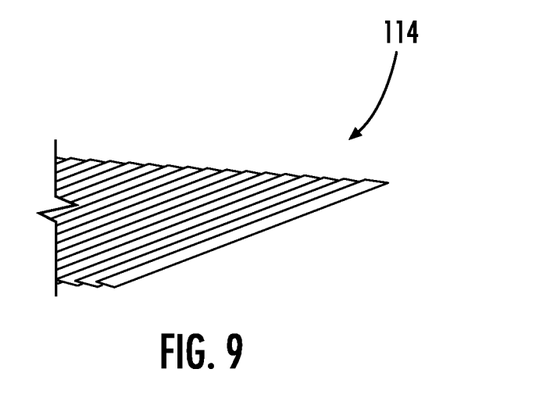
FIG. 9 is a top view of a portion of a bed of a frame assembly for a mold according to one embodiment of the present disclosure.

As discussed, the bed 114 of a frame assembly 110 according to the present disclosure may be modified, such as displaced and/or expanded, due to movement of the various frames 112. The bed 114 may thus be formed from a material that allows for such modification, and thus is relatively flexible and easily manipulated. FIGS. 7 through 9 illustrate various embodiments of materials utilizable to form a bed 114. For example, FIG. 7 illustrates one embodiment wherein the bed 114 is formed from one or more corrugated sheets. FIG. 8 illustrates another embodiment wherein the bed 114 is formed from one or more honeycomb sheets.

FIG. 9 illustrates another embodiment wherein the bed 114 is formed from a plurality of overlapping panels. In the case of, for example, corrugated or honeycomb sheets or other similar materials, each individual sheet is generally flexible in one or more directions such that the material may be manipulated during modification of the bed 114, such as by displacement or expansion, due to movement of the frames 112. In the case of, for example, the overlapping panels or other similar material, the panels are movable relative to one another to provide the overall bed 114 with general flexibility in one or more directions such that the material may be manipulated during modification of the bed 114, such as by displacement or expansion, due to movement of the frames 112. In further exemplary embodiments, the bed 114, such as the material thereof, may be generally non-porous. Thus, the materials disposed in the bed 114 in which to mold a rotor blade 16 may be adequately contained within the bed 114.

Thus, a mold 100 according to the present disclosure includes a generally reconfigurable frame assembly 110. Further, a mold 100 may include a mold material 150. The mold material 150 may be disposed in the bed 114, and may be utilized to form the portion of the mold wherein the rotor blade 16 is formed, such as by for example overlaying various composite materials thereon. For example, a cavity 152 may be formed in the mold material 150, the inner surface shape 152 of which may be the outer surface shape of the resulting rotor blade 16 or portion thereof. The cavity 152 may be formed by inserting a plug 160 in the mold material 150. The plug 160 may have an outer surface 152 that corresponds to the outer surface shape of the desired resulting rotor blade 16. The plug 160 may, for example, be removably inserted into the mold material 150 to form the cavity 152, and may then be removed from the mold material 150, thus exposing the cavity 152 for use in forming the rotor blade 16.

The mold material 150 may generally change from a deformable state to a non-deformable state. Thus, for example, the plug 160 may be inserted when the mold material 150 is in a deformable state, and removed after the mold material 150 changes to a non-deformable state, thus preserving the shape of the cavity 152. The mold material 150 may generally change from the deformable state to the non-deformable state through, for example, curing or otherwise suitably hardening, etc.

In some embodiments, for example, the mold material 150 may be an epoxy. In other embodiments, the mold material 150 may be a ceramic based washable material. For example, the material may include a ceramic microspheres and a water-soluble refractory binder. One suitable such material is the material utilized in Green-Aero tooling from Nevada Composites, Inc. In still other embodiments, the mold material 150 may be a ceramic composite, such as a thermally conductive ceramic composite. One suitable such material is available from UMG ABS, Ltd.

In exemplary embodiments, a mold material 150 according to the present disclosure is further alternatable between a deformable state and a non-deformable state. Alternatable means that, under normal conditions, the material can change from a deformable state to a non-deformable state and from a non-deformable state back to a deformable state. Thus, through use of an alternatable mold material 150, the mold material 150 can be reconfigured for use to form various rotor blades 16 with different shapes. The mold material 150 can be changed from the deformable state to the non-deformable state after insertion of a plug 160 to form a cavity 152 having a particular shape. Rotor blades 16 may then be formed using the mold 100 having this cavity 152. Then, after use to form these rotor blades 16 is complete, the material 150 can be changed from the non-deformable state to the deformable state. These steps can then be repeated, and the mold material 150 reused and reconfigured, to form rotor blades 16 having different shapes. The material 150 in these embodiments may include, for example, a plurality of treated particles and a fluid binder. Liquid may be extracted to change the material from the deformable to the non-deformable state, and may be reintroduced to change the material from the non-deformable to the deformable state. In some embodiments, a barrier may be provided between the plug 160 and the mold material 150 such that the plug 160 does not contact the mold material 150 when forming the cavity. Suitable such materials are available from 2Phase Technologies Inc., for example.

The present disclosure is further directed to methods for forming rotor blades 16. A method may include, for example, providing a frame assembly 110. The frame assembly 110 may include a plurality of frames 112, which may each be disposed in a first position relative to one another, as discussed above. The method may further include inserting a plug 160 into a mold material 150 disposed in a bed 114 of the frame assembly, as discussed above. The method may further include moving at least one frame 112 of the frame assembly 110 to as second position relative to another frame 112 such that the bed 114 is modified along a width-wise axis 118, as discussed above.

In some embodiments, the method may further include, for example, causing the mold material 150 to change from a deformable state to a non-deformable state, as discussed above. The method may further include removing the plug 160 from the mold material 150, as discussed above. The method may further include causing the mold material 150 to change from a non-deformable state to a deformable state, as discussed above. This change may occur in some embodiments before movement of the at least one frame 112 to the second position, as discussed above.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal languages of the claims.

What is claimed is:

1. A frame assembly for a rotor blade mold, the frame assembly comprising:
   a plurality of frames, at least one of the plurality of frames movable relative to others of the plurality of frames, each of the plurality of frames comprising a generally stationary base and a frame member slidable along a longitudinal axis of the base; and
   a bed supported by the plurality of frames, the bed defining a length-wise axis and a width-wise axis, the stationary base and the frame member extending longitudinally along the width-wise axis of the bed,
   wherein movement of the at least one of the plurality of frames causes a modification of the bed along the width-wise axis.

2. The frame assembly of claim 1, wherein the longitudinal axis is generally parallel to the width-wise axis.

3. The frame assembly of claim 1, wherein the frame member is a plurality of frame members, and each of the plurality of frame members is further movable relative to others of the plurality of frame members.

4. The frame assembly of claim 1, wherein the at least one of the plurality of frames is displaceable.

5. The frame assembly of claim 1, wherein the at least one of the plurality of frames is expandable.

6. The frame assembly of claim 1, wherein the movement of the at least one of the plurality of frames causes displacement along the width-wise axis of a portion of the bed supported by the at least one of the plurality of frames.

7. The frame assembly of claim 1, wherein the movement of the at least one of the plurality of frames causes expansion along the width-wise axis of a portion of the bed supported by the at least one of the plurality of frames.

8. The frame assembly of claim 1, wherein the bed is formed from one of a corrugated sheet, a honeycomb sheet, or a plurality of overlapping movable panels.

9. The frame assembly of claim 1, wherein each of the plurality of frames is movable relative to the others of the plurality of frames.

10. The frame assembly of claim 1, further comprising a bulkhead, the bulkhead positionable in the bed to modify a usable length of the bed.

11. A mold for forming a rotor blade, the mold comprising:
    a frame assembly, the frame assembly comprising a plurality of frames and a bed supported by the plurality of frames, the bed defining a length-wise axis and a width-wise axis, at least one of the plurality of frames movable relative to others of the plurality of frames, wherein movement of the at least one of the plurality of frames causes a modification of the bed along a width-wise axis, and wherein the at least one of the plurality of frames comprises a generally stationary base and a frame member slidable along a longitudinal axis of the base, the stationary base and the frame member extending longitudinally along the width-wise axis of the bed; and a mold material disposed in the bed.

12. The mold of claim 11, wherein the mold material is alternatable between a deformable state and a non-deformable state.

13. The mold of claim 11, wherein the mold material is an epoxy.

14. The mold of claim 11, further comprising a plug removably insertable into the mold material.

15. A method for forming a rotor blade, the method comprising;

providing a frame assembly, the frame assembly comprising a plurality of frames each disposed in a first position relative to one another, wherein the at least one of the plurality of frames comprises a generally stationary base and a frame member slidable along a longitudinal axis of the base;

inserting a plug into a mold material disposed in a bed of the frame assembly, the bed defining a length-wise axis and a width-wise axis, the stationary base and the frame member extending longitudinally along the width-wise axis of the bed; and moving at least one frame of the frame assembly to a second position relative to another frame of the frame assembly such that the bed of the frame assembly is modified along a width-wise axis.

16. The method of claim 15, further comprising causing the mold material to change from a deformable state to a non-deformable state.

17. The method of claim 16, further comprising removing the plug from the mold material.

18. The method of claim 16, further comprising causing the mold material to change from the non-deformable state to the deformable state before moving the at least one frame.

\* \* \* \* \*